United States Patent [19]
Leitner et al.

[11] 3,854,034
[45] Dec. 10, 1974

[54] SYSTEMS INCORPORATING APPARATUS AND METHODS FOR SIMULATING TIMED RELATED TEMPERATURES

[75] Inventors: Frank W. Leitner; Bobby B. Childress, both of Charlotte, N.C.

[73] Assignee: Coltron Industries, Inc., Charlotte, N.C.

[22] Filed: June 9, 1971

[21] Appl. No.: 151,562

Related U.S. Application Data

[62] Division of Ser. No. 779,778, Nov. 29, 1968, Pat. No. 3,586,830.

[52] U.S. Cl............... 219/494, 165/185, 219/469, 219/501, 219/530, 219/540
[51] Int. Cl. ............................................. H05b 1/02
[58] Field of Search .......... 219/388, 469, 470, 471, 219/494, 499, 501, 505, 530, 540; 236/32; 328/134; 28/62; 57/34; 165/32, 185, 186

[56] References Cited
UNITED STATES PATENTS

| | | | |
|---|---|---|---|
| 2,700,094 | 1/1955 | Hosack ........................ | 219/469 X |
| 2,777,931 | 1/1957 | Bundegaard et al. .............. | 219/270 |
| 2,846,147 | 8/1958 | Keating .............................. | 236/32 |
| 3,012,126 | 12/1961 | Ferguson ....................... | 219/501 X |
| 3,020,383 | 2/1962 | Onishi et al. ..................... | 219/530 X |
| 3,069,623 | 12/1962 | Murgio ........................... | 328/134 X |
| 3,166,667 | 1/1965 | Norton............................. | 219/469 |
| 3,211,893 | 10/1965 | Barlow............................. | 219/469 |
| 3,300,622 | 1/1967 | Swain............................... | 219/501 X |
| 3,365,654 | 1/1968 | Johnson.......................... | 219/501 X |
| 3,412,229 | 11/1968 | Seagrave, Jr.................... | 219/471 X |
| 3,414,711 | 12/1968 | Guyet et al. ....................... | 219/469 |
| 3,500,019 | 3/1970 | Childress ......................... | 219/471 |
| 3,517,730 | 6/1970 | Wyatt ............................... | 165/32 |
| 3,586,830 | 6/1971 | Leitner et al. .................... | 219/501 |
| 3,666,922 | 5/1972 | Leitner et al. .................... | 219/469 |

*Primary Examiner*—Volodymyr Y. Mayewsky
*Attorney, Agent, or Firm*—Wilfred G. Caldwell

[57] ABSTRACT

The present invention relates to methods and apparatus for establishing and controlling thermal systems wherein sensing means may anticipate or log temperature conditions at other points, such as at the work or loads and wherein the controlled heating means are related to the thermal capacity of the system. The simulation of load temperature, regardless of presence of anticipation, is obtained even under varying load conditions.

12 Claims, 19 Drawing Figures

| | THERM. COND. BTU/SQ.FT. OF IN. | SPECIFIC HEAT BTU/LB °F | SPECIFIC GRAVITY | SPECIFIC HEAT X SPECIFIC GRAVITY |
|---|---|---|---|---|
| ALUMINUM | 1540 | .23 | 2.71 | .623 |
| STEEL | 360 | .107 | 7.86 | .840 |
| BRASS | 830 | .09 | 8.47 | .760 |
FIG. 10
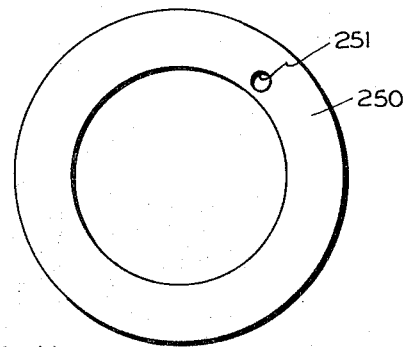
FIG. 11
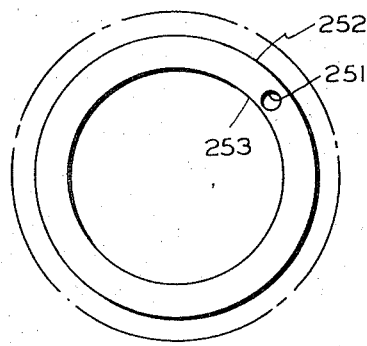
FIG. 12
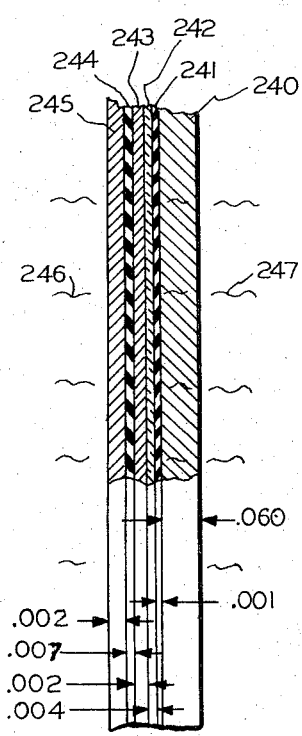
FIG. 9

SYSTEMS INCORPORATING APPARATUS AND METHODS FOR SIMULATING TIMED RELATED TEMPERATURES

The present application is a divisional application of U.S. Ser. No. 779,778 entitled LOGICAL CONTROL FOR DISCRETELY METERING ENERGY TO THERMAL SYSTEMS INCORPORATING APPARATUS AND METHODS FOR SIMULATING TIME RELATED TEMPERATURES, by the same inventors, now U.S. Pat. No. 3,586,830, filed Nov. 29, 1968 and issued June 22, 1971.

The present thermal system enables anticipation by virtue of the use or establishment of a secondary or thermal path different from the primary thermal path of heat flow from the heat source to the load. The secondary path or paths have at least one point in common with the primary path from which thermal parameters such as rate of heat flow and temperature gradient are known or may be determined, relative to the same factors for the primary path.

Therefore, various arrangements have been developed for providing matching, anticipating, or lagging conditions along the secondary or simulated path for location for sensing means to relate conditions corresponding to those at the load, which may or may not be inaccessible. Initially, let it be assumed that the thermal time constants are equal from the heating source to the heat and from the heating source to the sensing means, then for anticipation, it is only necessary to add heat to the sensing means, such as by a spiral heater wire or current of warm air, in order to permit it to anticipate the temperature momentum at the load, to control the energy input to the heating means, thereby avoiding overshoot. This may be considered for conditions for load or no load. For example, the preheating of the sensing means may be terminated when set temperature is reached; or the preheating may be relieved when the load is applied, thus calling for more temperature from the heating source in the latter case. Thus, various combinations of the principles herein taught may be made to produce the various embodiments hereinafter described in detail.

Basically, it will now be appreciated that the anticipatory function heretofore associated with electronic controls can be built into the thermal system such that standard computers can be used to monitor and/or control these systems with the only requirements being that the computer examine the digital inputs thereto against stored or known references or patterns to detect faults or deviations.

With the foregoing in mind, the invention will be better appreciated when examined in the light of various type control systems; such as, on the one hand, the on/off type control, and on the other hand, the proportional type control each with its own particular set of advantages, now for the first time realizable in the unique approach herein set forth.

Looking first at the conventional on/off system, it will be appreciated that it is basically a high resolution arrangement relative to load changes, but it can oscillate about this high resolution set point if the thermal capacity of the heating source is high relative to the thermal inertia and momentum of the system as heretofore existed.

Normally, the proportional type control is utilized to obscure the incompatibility between the control and the thermal system. However, under a given set of conditions, this system may accurately maintain set point temperature but in the event of load changes, ambient temperature changes, supply voltage changes, or other such disturbances, they operate to change the set point.

The present invention presents the ultimate in high resolution of on/off type controllers without overshoot because of the anticipatory built-in arrangement and with minimum oscillation about set point temperature.

While it will be understood that the thermal system herein disclosed is useful with many types of electrical controls, of the electronic logical control system of U.S. Pat. No. 3,586,830, nevertheless, the combination thereof permits anticipation and metering which in turn enables application of the invention to situations heretofore inaccessible, and also to conventional situations with attendant unusual advantages. For example, the invention may be applied to heated godets for handling synthetic yarns. In so doing, not only is a much more reliable and inexpensive control obtained, but it should be pointed out that the walls of the godet may be made of much less material, i.e., thinner material, less expensive material with reduced mass and mechanical inertia, with considerably less power required and with versatility of group monitoring and control at minimal expense with optimum reliability.

With the foregoing in mind, various objects of the invention are as follows:

The provision of apparatus and methods enabling accurate temperature control for even remote or inaccessible sources of loads.

The provision of such apparatus and methods enabling relatively low-cost controls with high accuracy compared to conventional proportional controls with re-set features which are relatively incompatible with digital computers.

The provision of such a thermal system providing builtin anticipatory functions for rapid-energy level change without overshoot, particularly during warm-up when the energy level is being accelerated from ambient to set level temperature.

The provision of a system and method enabling thermal control so that the simulated sensor temperature may be selected nearly equal to, equal to, or greater than the work temperature which may also be time related through predetermined or measured parameters enabling the sensor temperature to reach the set point equivalent temperature at any time relative to the load temperature reaching set point.

With the foregoing in mind, the invention will be better understood from a reading of the following detailed description thereof when taken in the light of the accompanying drawings wherein.

Figure 3:
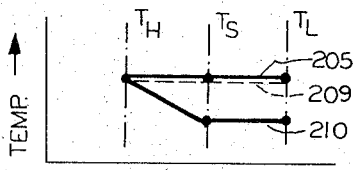
Figure 4:
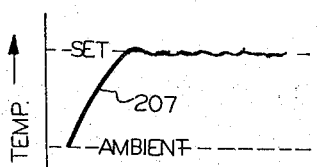
Figure 5:
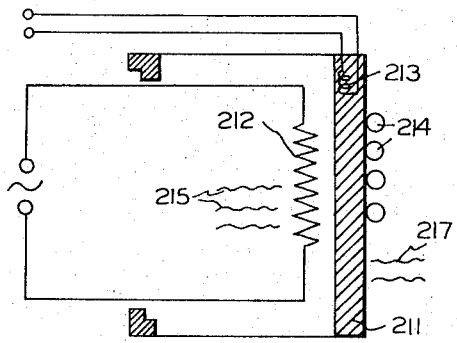
Figure 6:
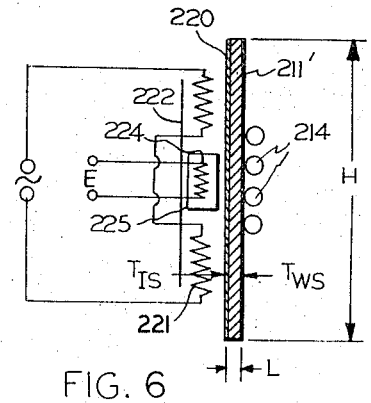
Figure 7:
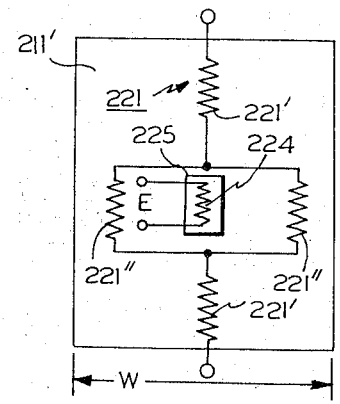
Figure 8:
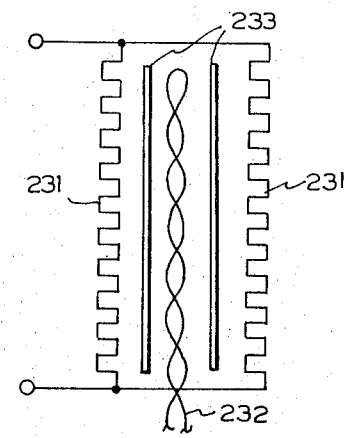
Figure 13:
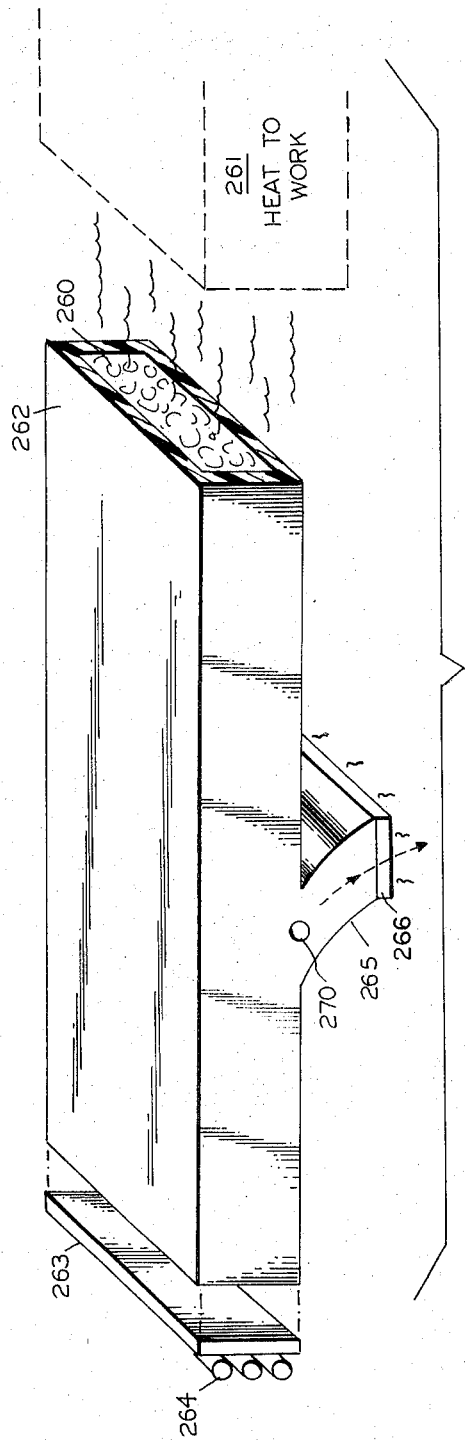
Figure 14:
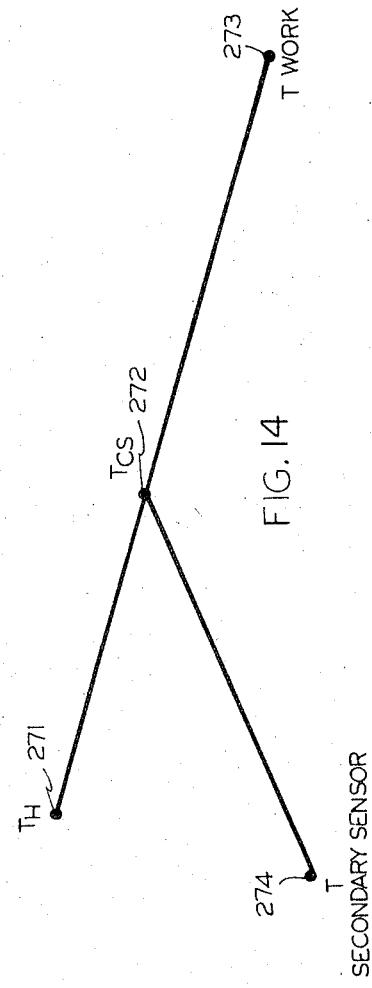
Figure 16:
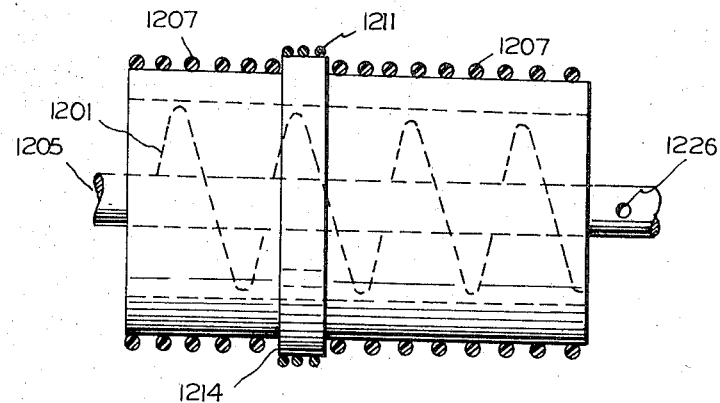
Figure 15:
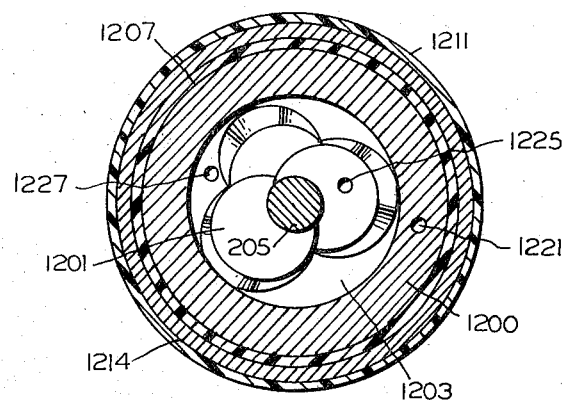
Figure 17:
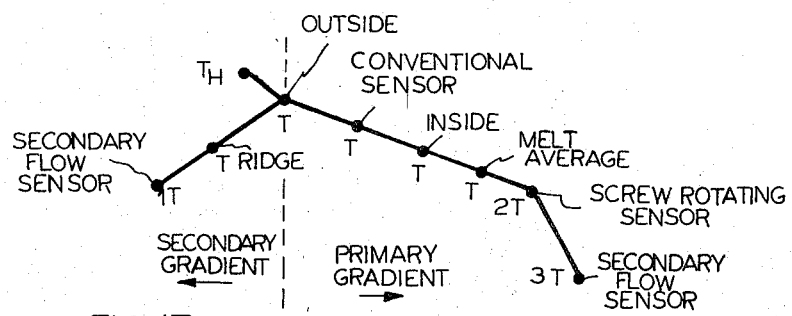
Figure 18:
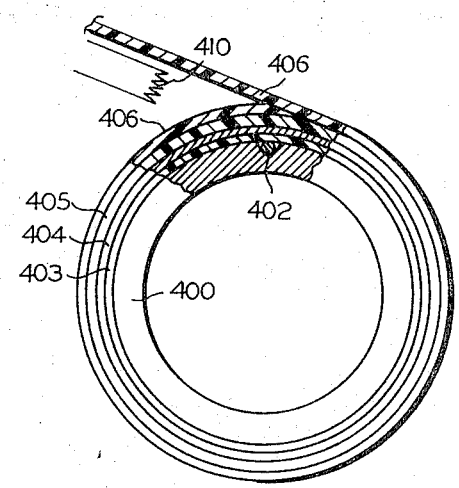
Figure 19:
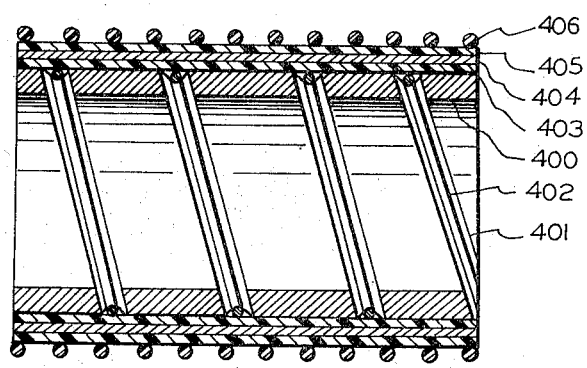

FIG. 3 illustrates one manner in which the present invention modifies the conventional temperature gradient chart, FIG. 4 shows a temperature-time chart for the present invention evidencing lack of overshoot, FIG. 5 illustrates a conventional type heater-sensor arrangement, FIG. 6 is a view of one heater-sensor embodiment of the present invention, FIG. 7 is a different view of a portion of FIG. 6, FIG. 8 shows an alternative arrangement for the sensor-heater of the present invention, FIG. 9 shows a dimensioned thermal system patterned after the systems of FIGS. 6 and 7, and wherein pre-determined quantities of electrical insulation may be selected to serve as the control for the heat leak path, FIG. 10 is a chart of various thermal co-efficients for different materials, FIG. 11 illustrates a conventional point sensing arrangement for a cylinder or godet, FIG. 12 suggests the elimination of mass from such an arrangement, FIG. 13 is a perspective view of the invention incorporating intentional heat leak, FIG. 14 is a temperature chart for selected temperatures obtaining in the structure of FIG. 13, FIG. 15 shows one embodiment of the invention applied to an extruder, FIG. 16 is a view in side elevation of the structure of FIG. 15, FIG. 17 is a temperature chart for the structure of FIGS. 15 and 16, FIG. 18 is an end view, partly in section, of a heated Godets or other cylindrical type roll, and FIG. 19 is a view, partly in section and partly in side elevation, of the roll of FIG. 18.

In the thermal arrangements explained in connection with FIGS. 6 and the Figs. thereafter, consider first a conventional pin or drum heater adapted to be heated to a controlled temperature for drawing or otherwise handling synthetic yarn. Basically, the designer may select from three heating arrangements, the first employing induction heating; the second, flame or other non-electrical heating; and the third, heating wire disposed within the cylinder.

The object herein is to maximize the sensor heater efficiencies and provide new advantages by taking advantage of as many parameters as possible, such as materials, dimensions, physical deployment, and, in addition, simulated arrangements particularly provided for use where the heating surface or work is inaccessible, although this technique may be employed under all circumstances to advantage.

Figure 1:
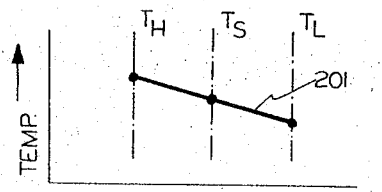
FIG. 1 is a temperature gradient chart of conventional nature.

Conventional temperature sensing may be achieved externally using the pyrometer or a thermistor of other sensing unit embedded in the wall of the cylinder. First of all, the temperature gradient obtaining in such an apparatus would show the temperature of the heater higher than the temperature of the sensor, because of the thermal drop from heater, part way through the wall to the sensor, and then, of course, the temperature of the load at the lowest temperature of all because the load or external surface of the drum is more remote from the heater source (see FIG. 1).

The load line or gradient is illustrated at 201. The usual difference in temperature between $T_H$ (heater) and $T_L$ (load) is large, so it is not only an inefficient arrangement, but also indicates that a good deal of thermal inertia might be encountered in such a system and, inherently it would be subject to slow response, high mass, and an overshoot type arrangement, which when employed with on-off type heat, would also show a substantial unstable set temperature, as may be seen in FIG. 2. Note that the temperature-time curve 203 is relatively slow rising, evidencing the temperature momentum due to the mass. It also substantially overshoots the set temperature as shown at 203'. Additionally, the ripple factor occasioned by the undulations about the set temperature is relatively high.

In FIG. 3, there is shown an idealized gradient wherein the slope of the load line 205 is near zero.

Figure 2:
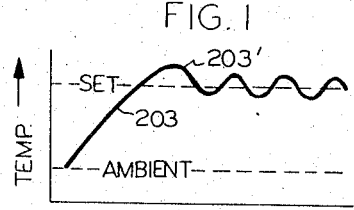
FIG. 2 is a conventional temperature-time chart showing warm-up overshoot.

In FIG. 4, there is shown a somewhat idealized temperature-time curve 207 wherein no overshoot is present and the ripple factor is an absolute minimum for an on-off type control. Additionally, the rise time of curve 207 to set point temperature is much less and overshoot has been completely eliminated. The sensor-heater arrangement herein described produces the gradient and response curves approximating FIGS. 3 and 4. In actual practice, gradient 209 in FIG. 2 is obtainable, whereas the response curve 207 of FIG. 4 is an obtainable companion curve therefore. Moreover, the invention provides unusual control over the gradient, as for example, the gradient 210 of FIG. 2 may be produced or various other unique gradients.

In FIG. 5 there is shown conventional type approach to a heater-sensor arrangement wherein the drum or cylinder section 211 is shown with an internal heater 212, a sensor 213, and a load in the form of synthetic strands 214. It can be seen that heat is lost by internal radiation 215 and external radiation 217. Obviously, the metal 211 accounts for a large thermal drop and additionally, it may be noted that the point sensor 213 ordinarily embedded in metal 211 via an edge hole or aperture is not symetrical thermally with the load or heater; and, of course, is at a substantially different temperature than either.

With the conventional heater and control in mind, the principles obtained in the novel arrangements hereinafter depicted will first be discussed followed by a description of the structure preferred in the embodiments to appear hereinafter. Therefore, looking at FIGS. 6 and 7, it will be seen that the basic thermal conductivity equation:

$$T_2 = [Q/A] \, L/K$$

may be applied to the heated body 211', which has dimensions of a thickness corresponding to L, a width corresponding to W and a height corresponding to H. The temperatures are $T_{is}$, which is the temperature of the inside surface, with $T_{ws}$ being the temperature of the working surface. The total energy, dissipated over the working surface having an area A of W times H, is identified as Q. Then, for a given heat flow per unit of area, the temperature gradient delta $T_2$ is equal to $T_{is}$, minus $T_{ws}$. The basic equation covering the relationship herein described, as above set forth, is delta $T_2$ equals Q over A (times L over K) where K is the thermal conductivity of the solid, the other parameters or quantities having previously been defined.

Looking at this equation, it appears obvious that for a given material (K), the temperature gradient is directly proportional to the thickness (L), and it is desired in the embodiments hereinafter set forth to decrease the gradient and, therefore, the thickness of L dimension is made as small as feasible, for example, 40 to 50 per cent of the thickness of the conventional body such as 211 in FIG. 5.

The other quantities of this equation will be analyzed in detail to provide guidelines for the design of the new embodiments, but in the meantime, the object is to produce a structure capable of creating a temperature approximating $T_{irs}$, without access to this temperature or surface, through simulation by intentionally establishing and using a heat leak which dissipates a small percentage of total energy or heat in the primary load or work path in the form of a second gradient with known parameters and conditions for normal operation to permit sampling based on this simulated gradient.

Interestingly enough, now that there is recognized a primary and secondary path, these may be interrelated by selecting a common temperature point, such as the temperature of the inside surface of the body to be heated, and build therefrom in different directions, the primary gradient to the load and the intentional heat leak gradient or secondary gradient, through the simulated path to obtain the necessary information without access to the load itself or surfaces attendant thereto. Thus, heat flow can be controlled before and after the sensor — in this case, a space sensor.

Next, the dimension of time as a parameter will be brought into the study to indicate that the materials selected may control this parameter and hence, influence the gradient in and unusual or different way.

Looking to the table of FIG. 10, it will be appreciated that the various characteristics for three metals, aluminum, steel, and brass are compared as to their thermal qualities. Considering first aluminum, there will be noted that its thermal conductivity, which relates directly to the gradient, measures 1540 BTU per square foot per degree Fahrenheit for one inch thickness. Whereas, steel has a measure of 360. Thus, a greater temperature differential, almost four to one will appear across the same thickness of aluminum as steel. However, when the columns for specific heat and specific gravity are multiplied together to take into account the inherent properties and densities relative to thermal capacities of these metals, it will be appreciated that the measure of time from a given heat source to establish the gradients per material are not so different. As for example, aluminum provides a measure of 0.623, whereas, steel a measure of 0.840, only about 150 per cent thereof, which would be less than one and one-half times, the time dimension for a given wattage heat source, whereas the temperature drop or gradient dimension is of the order of 4 to 1. Thus, the secondary gradient can not only be achieved as to time, but it can also be perfected to the extent that secondary gradient characteristics are established just prior to the primary gradient characteristics, thereby avoiding overshoot and bringing the entire total system into stabilization at the set temperature point.

Thus, it may be appreciated that for a given amount of material, the factors to take into consideration are: Thinness commensurate with the strength necessitated by the particular work function to be achieved, as well as the minimum amount of material to be heated, thereby minimizing the gradient thereacross. As for example, consider the well-known pin heater, in which a cylindrical body of material is to be heated from the inside thereby creating a surface temperature, in turn heating yarn of the synthetic variety for twisting, drawing, curing, and the like. To reduce the gradient and to minimize the time required to establish the gradient, the pin heater will be made as thin as possible commensurate with the strength to withstand the pressures of the synthetic material being handled. Thus, it becomes necessary, in the leak path, to simulate the operations attendant thereto to establish an even faster path for the same gradient in order to achieve the no overshoot condition for pre-set temperature. With this type zeroing in of the parameters, it now becomes apparent how the control system can be a high resolution on-off inexpensive type control compatible to these parameters, capable of handling this system, and also susceptible to the digital computer logic analyzing. This permits the digital analyzing approach which is the epitome of high resolution accurate control in an otherwise analogue system. From a practical standpoint, as long as the body of the thermal system can be made thin, obviously the gradient is low and the time response is negligible. Therefore, from a condition of work load on, to work load off, there is no appreciable difference to introduce a reset to the control system.

This system offering distinct advantages where the thickness of the body can be minimized, still offers advantages where the thickness of the metal and corresponding temperature gradients are largely relative, and time factors are largely relative to the thin wall system.

In FIG. 6 this embodiment of the invention is depicted as also being applied to the heating of synthetic yarn 214. It may be appreciated that the godet or body 211' to be heated is now made considerably thinner, thereby conserving costs and material and eliminating considerable thermal inertia. Adjacent to the body 211', there is a layer 220 of foil, such as aluminum foil, to serve for transferring heat. Also, it should be pointed out that in certain applications, such foil may serve as the heat radiator, for example, when the invention is employed in automobiles, the foil may comprise a portion of the decor or trim or may be deployed beneath the carpet or under the upholstery. In such event, the foil 220 would preferably be anodized or otherwise coated or painted black.

Next, the heater 221 is contained within suitable electrical and thermal insulation for the required purposes herein, examples of which will be described hereinafter. Preferably, an apertured heat shield in the form of foil 222 is deployed on the other side of the heater 221 with the highly polished reflective side of the foil directed inwardly to minimize heat loss. The sensor 224 is disposed within the vicinity of heater 221 and is thermally insulated or controlled by the material or enclosure 225. This material may comprise, for example, selected electrical insulation with known thermal properties, silicon rubber insulation or combinations thereof or even heat shielding plates or enclosures, such as asbestos, mica, or the like.

In FIG. 7 it will be seen how the heater 221 is comprised of suitable heater wire 221', split into parallel paths 221''. The sensor 224 is then physically deployed within the parallel configuration, with its insulated enclosure of material 225 serving to control the heat flow to the sensor 224 in a manner related to the heat flow going to load 214 (FIG. 17).

One alternative deployment is shown in FIG. 8 wherein the heater wire 231 is also laid down in parallel configuration, but the sensor 232 is bifilar wound to cancel out induced signals or currents. This bifilar arrangement is, of course, critical where induction heating is employed, but has proven also of value with other heating arrangements. The control insulation is now shown as the heat shields 233 for control to simulate the path or heat flow to the load.

In FIG. 9 a suitable dimensioned heater-sensor arrangement is shown wherein, when applied to a pin heater for textile strands, it was found that the sensor reached set temperature 2°C. ahead of the work. The heat supplied was metered, and in four seconds the work and sensor had reached the same temperature which was established at set point with no overshoot. In FIG. 9 the work is shown as a section of the pin heater aluminum wall 240 having a thickness of 0.060 inches. Next close thermal coupling is obtained by using a layer 241 of silicon rubber insulating coating with adhesive of thickness of approximately 0.001 inches which is permanently bonded or vulcanized to the interior of the pin body wall 240. Next, there is basically employed a fiberglass layer 242 of thickness of 0.004 inches which is actually impregnated with the silicon rubber from layer 241 during heat treating or bonding at elevated temperatures. The next layer 243 includes the metal or current conductive foil heater and sensor, each of approximately 0.002 inches in thickness, embedded in the structure.

Next, a silicon rubber impregnated fiberglass layer of approximately 0.007 inches is shown at 244 with a 0.002 inches thick foil layer 245 completing the structure. Minimal heat loss is indicated at 246 with maximum heat transfer shown at 247, obtained because of the close thermal coupling of the heating element to the heater body and because of the lowered emissivity for lost heat 246 due to the polished foil layer 245 and supporting structure.

In the array of FIG. 9, the sensor is preferably of a nickel alloy, but can also be of e.g. copper and perform perfectly satisfactorily, as a substitute for platinum at considerable cost savings. Also, in such an arrangement current through the heater can produce the heat for curing the silicon rubber to produce the bonding of the sensor heater together and in intimate contact with the heater body.

FIGS. 11 and 12 illustrate one reason why the sensor-heater of this invention may be used with less material (and even usually less expensive material) required for maintaining the heat path to the work. In FIG. 11, a conventional heated drum or cylinder 250 is shown with a hole 251 being provided to receive the sensor, such as a thermistor. In FIG. 12 the dotted line 252 indicates how the material 250 can be reduced or removed when the heater-sensor of this invention is employed with at least the heater affixed along the inner surface 253. Alternatively, of course, in certain applications the heater and/or sensor can be employed externally of the body 250 as will be shown. In any event, it is seen that a definite finite thickness must be provided to accomodate a conventional point sensor within the body to sense temperature; whereas, the present invention relieves this problem and attendant material.

In FIGS. 13 and 14, there is shown a schematic illustration of the invention applied in combination with a conventional sensor to produce logical relations susceptible to computer handling. A heat conductor 260 provides the primary heat path to the work or load 261 and it is heavily insulated on all sides, as shown at 262, the heating element 263, preferably being in contact with conductor 260 and outwardly insulated at 264. The heat leak path is shown at 265 with the sensor 266 of the present invention.

In FIG. 13, the leakage path 265 may comprise as little as, e.g. 0.01 or 0.001 of the heat passed along the primary path, and, of course, heat leak path 265 may be intentionally constructed or at least intentionally located in a heat dissipating region.

By locating a conventional sensor 270 at the junction of heat leak path 265 and the primary path, some interesting observations may be drawn from the relationship of temperatures at the various locations. The temperature of the heater is shown at the point 271 with the temperature of the conventional sensor 270 located at the common point of the primary heat path and the secondary heat path, the primary temperature path (FIG. 14) following a drop to the work temperature, shown at 273, and the secondary following a different or simulated path to the secondary sensor temperature at point 274. Now, knowing the temperature at the common point 272, differentials may be taken along the primary and secondary paths to provide information as to rate. Additionally, of course, it is now possible to apply further control, principally to the secondary sensor 266, as by pre-heating the same by radiant heat or with a tiny electrical current, or by cooling the same with cool air, or otherwise controlling, as by materials, the relative time response for the temperature from point 272 to points 273 and 274. Thus, a considerable amount of information may be derived and highly delicate control obtained with emphasis on eliminating overshoot, or alternatively, intentionally building in certain controlled amounts of overshoot where heat momentum or slow response is desirable.

In a different application of the invention, reference is had to the heavy wall extruder 1200 (FIG. 15) wherein the wall of the extruder barrel has to withstand heavy pressures, but is limited in the thickness of metal and limited to the type of metal that can be used and, therefore, must live with — so to speak — gradients that are excessive to a good thermal system and time responses that are much longer than would be desired. However, the present invention can still simulate the temperature of the inner wall of the body, and even the average temperature of the medium within the body of the heater which is viewed as a cylindrical barrel. It would be an obvious advantage now to combine the data that could be derived from the new concept with the data that could be derived from the conventional concept. However, a third principle is now available wherein the melt 203 of the extruder may serve as a heat source for the impeller 201, propelling the melt along the barrel of the extruder to provide additional information for the computer.

In the conventional method, the primary gradient is through the thickness of the barrel of the extruder and almost suggests that a third measurement of temperature (rotating) be taken. For instance in a heavy walled or bodied thermal system, it is suggested that although there can be established a thermal gradient typical of the primary gradient, the time response due to the thickness of the metal could cause great time lag and errors in general at the computer. Therefore, it is proposed that a conventional sensor, located within the primary path and in the body of the extruder, as well as a rotating sensor that would be embedded in the rotating impeller be employed. The method of deriving the signal information and converting same to a frequency for rotating machines is disclosed in a patent application by B. B. Childress, Ser. No. 698,784, dated Jan. 18, 1968, and assigned to the same assignee as this application, bearing the title, "APPARATUS AND METHOD FOR DEVELOPING TEMPERATURE INDICATIVE SIGNALS FROM STATIONARY OR ROTATING HEATERS OR DRUMS AND FURTHER FOR DEVELOPING CONTROL SIGNALS FROM THE TEMPERATURE," now U.S. Pat. No. 3,500,019, issued Mar. 10, 1970.

The computer now has three signals, plus their time relationship for deriving data and developing command signals to a controller which would regulate the current flowing through the heating element using the previously described space sensor device for sensing temperature in the heat leak path.

In FIGS. 15, 16, and 17 there is illustrated a structure and temperature gradient flow diagram for enabling computer logic to determine several factors concerning the auger, melt temperature, barrel capacity, flow rate, impingements or blockages, ruptures and the like, merely from a knowledge of the temperatures and their inter-relation in the two gradients, i.e., primary gradient and heat flow simulator or secondary or secondary intentional heat leak gradient, herein developed for the purpose of enabling computer techniques to analyze and handle, i.e., cope with all problems, moniter and control, the heretofore rather difficult inaccessible operation and information derivable from basically the interior of a high speed expensive, heavy wall thermal extruder system.

In FIG. 15 the heavy wall barrel 1200 is used for the extruder mechanism above described, but now analyzed in detail. The extruder barrel 1200 contains the screw or impeller driver 1201, adapted to propel the melt, indicated at 1203, toward its exodus end. A shaft 1205 supports the screw or impeller 1201. It is interesting to note that while the primary source of heat to the melt is in the external heating coils 1207, nevertheless once the impeller 1201 is caused to rotate or drive the melt, via shaft 1205, there is experienced another factor in the form of sheer or frictional heat, generated from the contact and propulsion of the melt 1203 by the screw or impeller 1201. It is for this reason that several sensors may be employed to determine heretofore undeterminable quantities or information concerning such an arrangement. For example, the space sensor 1211 may be carried on a ridge, such as 1214, raised beyond the extruder barrel 1200, for the simple reason that barrel 1200 is already of heavy thickness and it is convenient to provide the heat loss or leak path out of the same material and simply more of the same. Thus, in FIG. 15, for considering the control of FIG. 17, there are preferably located, first a conventional sensor 1221, embedded in the thick or heavy barrel wall 1200, a rotating impeller sensor 1225, carried by the screw or one of the blades of impeller 1201 with its output available via shaft 1205 to the extreme or other end of the extruding device, and an apparent or simulated temperature of the melt non-existent sensor, simulated within the melt at position 1227, which is in reality the space sensor 1211, predicting the temperature at point 1227, as is apparent from FIG. 17.

Thus, in FIG. 17 the right hand portion of this graph relates to the various temperatures and gradient for the primary gradient necessitated by the heat load, whereas the left-hand portion is the simulated or artificially produced secondary gradient heretofore identified as the heat leak gradient. Thus, the common temperature is $T_H$, the temperature of the heater at the outside surface of the barrel. Obviously, heat flows from the external surface of the barrel, i.e., the source of heat, outwardly along the ridge 1214 to the space sensor 1211 and inwardly through the barrel 1200 to the melt 1203 and impeller 1201.

Tracing this diagram from FIG. 17, it will be seen the normal or work gradient extends from the highest heater source temperature $T_H$ to the conventional sensor 1221 temperature, initially encountered as the heat progresses inwardly. Next, the temperature T inside is encountered and while not necessarily measured in this embodiment, a sensor could be placed at the inside of barrel 1200; but, however, because of the extruder nature and the spiral or circulatory movement of impeller or driving mechanism 1201, this sensor has been eliminated and thus, also all attendant problems involved with fracture, damage, and inaccessability. However, this temperature must be along the gradient and could be calculated from the information herein available.

Next, proceeding to the right in FIG. 17, along the normal load gradient, the average melt temperature is encountered, as depicted at point 1227 in FIG. 15. It is this temperature which has been simulated for normal operating conditions by the heat flow simulator and the secondary temperature gradient to the left of the center line of FIG. 17, as indicated at the temperature secondary flow sensor or space sensor 1221.

Continuing on with the gradient normally supplying the work load to the right of FIG. 17, it will be noted that the least temperature encountered is that of the screw or rotating sensor, as shown at 1225 in FIG. 15 which must derive its heat from the primary source, i.e., the heater winding 1207, plus the heat generated by the friction and sheering forces of impeller 1201, operative on melt 1203. Thus, due to the fact that rotating energy is imparted to impeller 1201, driving melt 1203, any type of frictional or sheering energy develops additional heat, including movement of the melt 1203 relative to the internal surface of barrel 1200. This, of course, is additional to that generated within the melt itself, whether it be from these forces or from the external heater, which is the primary heating source 1207.

Returning to FIG. 17, it will be noted when the heat flow simulator to the left of the center line is viewed, that the first temperature drop is attributable to the gradient across the ridge 1214; thus, showing temperature of the ridge at the first spot. Thereafter, the heat flow simulator temperature gradient is interposed between the temperature of the ridge and the temperature of the secondary flow sensor. This region is shown by the control insert 1225, which may be inserted encapsulated, bonded, or otherwise employed to balance any given situation against the desired characteristics for computer logical control. This may be likened to a vernier trim in engineering terminology, such as the wafer layer shim or other thermal regulating laminate or control device 1225, which may be made available in various sizes and shapes to match the characteristics, as specified herein for logic control.

Now, to examine the logic control available from the extruder thermal arrangement outlined in FIGS. 15 and 16 and graphed in FIG. 17, it may be appreciated that the logic or computer may encounter any one or more of the several following exemplary situations and provide an analysis which follows. Number one, assume that the extruder is out of melt. Then the first detectable parameter would come from the screw sensor 1225 because the primary heat supply source would be broken and the sheer or frictional heat supply source would be non-existent. Therefore, the temperature at 1225 would drop.

Otherwise, other parameters would be changing if the temperature of screw sensor 1225 dropped, but not so when the situation is caused by an absence of melt. Thus, an AND situation is created for logical analysis by such a circuit or computer. The other criterion would be that if truly there is no melt, all other temperature sensors would increase. Otherwise, this condition is not true and it would not signify an out-of-melt condition as will be brought forth in the following further logical situations.

In the second exemplary situation, let it be assumed that the extruder output becomes clogged. Then, the first fact is that the screw sensor temperature at 1225 would rise rapidly. As an AND situation, but incorporating the time parameter, the other temperatures would all go up. Therefore, the computer now recognizes a differential or slope of the curve situation and can provide the information required to analyze and/or detect this problem.

By way of example, situation three may be such that the extruder ruptures, in which event, the screw sensor pressure at 1225 goes down immediately and after a time delay, the other pressures go down. Obviously, such a situation can be detected and analyzed by a computer or a logical arrangement.

Now, with the many known parameters, and with the heat flow simulator prepared for normal conditions, it is apparent that numerous other situations could be presented in which the computer could analyze and arrive at the proper conclusion for control and/or handling or direction or alarm signalling of the particular situation encountered. It is for this reason that automatic factory control involving many or innumerable temperature systems.

It is important to note that the heat flow simulator or heat leak path provides certain heretofore unknown information useful in the logical determinations, as for example, it is always important to know what the average temperature of the melt or any other point should be during normal operating conditions and this is apropos whether or not such point is accessible or inaccessible.

Referring to FIGS. 15 and 16, it is noted that the conventional method of heating such a heavy wall extruder is inefficient, inaccurate, and extremely slow in response. By adding the sensor 1225 to measure the temperature of the rotating screen and a second rotating sensor 1226 to measure the temperature gradient along the number 2 heat leak path, there is developed valuable information when used in conjunction with the conventional sensor 1221 and the heat leak sensor 1211. However, the application of the principle of heating the inside wall of the vessel produces a much more efficient system. In this case, the action of the heavy wall heavy thermal intertia extruder barrel is reversed. This heavy wall now becomes the heat leak path, instead of the primary heat flow path.

What is claimed is:

1. A thermal system comprising a primary heat flow path from a heat source to a load; a secondary heat flow path from the primary heat flow path extending in a direction away from the primary heat flow path; sensing means responsive to heat in the secondary path at a given position; and heat flow control means having predetermined heat flow characteristics in the secondary path between the primary path and said given position.

2. The method of remotely obtaining thermal conditions of a load supplied heat over a path by a heat source comprising the steps of: establishing a heat path of known thermal parameters extending away from one of said source and load; and sensing the temperature at a predetermined location along the heat path to obtain at least one of time and temperature simulated information relative to the load.

3. The method of simulating thermal conditions at a load supplied by a heat source over a primary heat path comprising the steps of: establishing a heat leak path away from the primary heat path; intentionally changing one of the temperature time response and temperature gradient to a predetermined point along the heat leak path by at least one of interposing material having predetermined heat flow characteristics and applying hot or cold to the heat leak path; and sensing the temperature at the predetermined location along the heat leak path to obtain simulated information relative to the load.

4. The method of remotely obtaining at least one thermal condition of a load supplied heat over a primary path by a heat source comprising the steps of: establishing a heat path at least partly different than the primary path having at least a thermal parameter known relative to the corresponding thermal parameter of the primary path to the load; and sensing at a point along the heat path to develop control signals for regulating the heat source to provide optimum load control.

5. The method of claim 4 wherein said thermal parameter is time response of the primary path as a standard for comparison against time response of at least a portion of the heat path.

6. The method of claim 4 wherein said thermal parameter is temperature at the load relative to substantially the same temperature at a sensing point location along the heat path.

7. The method of claim 4 wherein the sensing point is located at said location along the heat path so that the temperature time response to said location on the heat path is faster than the temperature time response from the source to the load to provide anticipation for preventing temperature overshoot at the load through regulating the heat source.

8. The method of claim 4 comprising the further step of selecting said point wherein the temperature time response to said point on the heat path from the source is the same as the temperature time response to the load from the source.

9. The method of claim 4 wherein the temperature at the point is established substantially the same as the temperature at the load by making the thermal gradient drops the same from the source to said point as from the source to the load.

10. The method of claim 4 wherein said one condition is temperature and said thermal parameter is thermal conductivity of the material of the heat path times the length of the heat path to a location thereon.

11. The method of claim 4 wherein said one condition is time constant and said thermal parameter is the thermal capacitance of the heat path.

12. Apparatus for remotely obtaining at least one thermal condition of a load supplied heat over a primary path by a heat source comprising a heat path different than the primary path having at least a thermal parameter from the source to at least a point on the heat path known relative to the corresponding thermal parameter of the primary path from the source to the load; and sensing means disposed at said point along the heat path to develop control signals for optimum load control.

* * * * *